(12) United States Patent
Eguchi

(10) Patent No.: US 10,332,458 B2
(45) Date of Patent: Jun. 25, 2019

(54) DISPLAY DEVICE

(71) Applicant: Sharp Kabushiki Kaisha, Sakai, Osaka (JP)

(72) Inventor: Makoto Eguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 161 days.

(21) Appl. No.: 15/508,629

(22) PCT Filed: Aug. 31, 2015

(86) PCT No.: PCT/JP2015/074704
§ 371 (c)(1),
(2) Date: Mar. 3, 2017

(87) PCT Pub. No.: WO2016/035753
PCT Pub. Date: Mar. 10, 2016

(65) Prior Publication Data
US 2017/0287387 A1 Oct. 5, 2017

(30) Foreign Application Priority Data
Sep. 5, 2014 (JP) .................................. 2014-180804

(51) Int. Cl.
G09G 3/20 (2006.01)
G09G 3/34 (2006.01)
(Continued)

(52) U.S. Cl.
CPC ......... *G09G 3/3466* (2013.01); *G02B 26/023* (2013.01); *G02B 26/0833* (2013.01);
(Continued)

(58) Field of Classification Search
CPC .................. G09G 3/3446; G09G 3/3674; G09G 3/3677
See application file for complete search history.

(56) References Cited

U.S. PATENT DOCUMENTS 6,396,469 B1   5/2002  Miwa et al.
9,406,266 B2 * 8/2016  Park ....................... G09G 3/20
(Continued)

FOREIGN PATENT DOCUMENTS

JP   H11109921 A   4/2007
JP   2007212571 A  8/2007
(Continued)

*Primary Examiner* — Patrick F Marinelli
(74) *Attorney, Agent, or Firm* — ScienBiziP, P.C.

(57) ABSTRACT

Provided is a display device characterized in that the electric power consumption when optical modulation elements (for example, MEMS shutters) are driven is reduced. A display device (1000) includes a backlight unit (1), a display panel unit (2), a source driver (3), and a controller (4). The backlight unit (1) includes a light source. The display panel unit (2) includes segmented pixel regions AR11 to ARnm each of which includes: a plurality of pixels each of which includes an optical modulation element that performs modulation control with respect to light projected from the backlight unit (1); and a segmented gate driver that controls the optical modulation elements of the pixels. The source driver (3) is a driver that controls the optical modulation elements of the pixels. The controller (4) controls the light source of the backlight unit (1), the segmented gate drivers GD11 to GDnm, and the source driver (3).

3 Claims, 9 Drawing Sheets

(51) Int. Cl.
*G02B 26/02* (2006.01)
*G02B 26/08* (2006.01)

(52) U.S. Cl.
CPC ............. *G09G 3/2018* (2013.01); *G09G 3/34* (2013.01); *G09G 3/3413* (2013.01); *G09G 3/3433* (2013.01); G09G 2310/0235 (2013.01); G09G 2310/08 (2013.01)

(56) References Cited

U.S. PATENT DOCUMENTS

| | | | | |
|---|---|---|---|---|
| 9,542,901 | B2 * | 1/2017 | Kim | G09G 3/3677 |
| 9,747,846 | B2 * | 8/2017 | Sugihara | G09G 3/3433 |
| 9,798,339 | B2 * | 10/2017 | Tanaka | G02F 1/1368 |
| 2010/0039361 | A1 * | 2/2010 | Hsu | G09G 3/3677 345/92 |
| 2010/0265224 | A1 * | 10/2010 | Cok | G09G 3/3266 345/206 |
| 2011/0043541 | A1 * | 2/2011 | Cok | G09G 3/006 345/690 |
| 2012/0287494 | A1 * | 11/2012 | Takahashi | G02B 26/02 359/230 |
| 2013/0321499 | A1 * | 12/2013 | Park | G09G 3/3611 345/698 |
| 2014/0078123 | A1 * | 3/2014 | Park | G09G 3/20 345/205 |
| 2014/0092080 | A1 * | 4/2014 | Fukunaga | G09G 3/3696 345/212 |
| 2015/0293546 | A1 * | 10/2015 | Tanaka | G02F 1/1368 327/541 |
| 2016/0019856 | A1 * | 1/2016 | Tanaka | G09G 3/3648 345/206 |
| 2016/0370635 | A1 * | 12/2016 | Tanaka | G02F 1/1368 |
| 2017/0047032 | A1 * | 2/2017 | Nishiyama | G02F 1/133 |
| 2017/0047033 | A1 * | 2/2017 | Tanaka | G02F 1/133 |
| 2017/0047038 | A1 * | 2/2017 | Noma | G02F 1/1368 |
| 2017/0287381 | A1 * | 10/2017 | Park | G09G 3/2092 |
| 2017/0287387 | A1 * | 10/2017 | Eguchi | G09G 3/2092 |
| 2018/0026218 | A1 * | 1/2018 | Kobayashi | H01L 51/0512 349/143 |

FOREIGN PATENT DOCUMENTS

| | | |
|---|---|---|
| JP | 2009520245 A | 5/2009 |
| JP | 2010048989 A | 3/2010 |
| JP | 2013050720 A | 3/2013 |
| WO | 2007075832 A2 | 7/2007 |
| WO | 2014069529 | 5/2014 |

* cited by examiner

DISPLAY DEVICE

TECHNICAL FIELD

The present invention relates to a display device that displays an image (a video image), and in particular, relates to a technique for controlling optical modulation elements incorporated in a display device.

BACKGROUND ART

A display device in which MEMS (Micro Electro Mechanical Systems) shutters are used as optical modulation elements is known (hereinafter such a display device is referred to as a "MEMS shutter display device") (see, for example, Patent Document 1 (JP-A-2013-50720)). The MEMS shutter is, for example, a shutter realized by the MEMS technique (an element (structure) that controls transmission and/or cutoff of light), as disclosed in Patent Document 1.

In such a MEMS shutter display device, unlike a liquid crystal display device, there is no need to provide color filters or polarizing plates. In the MEMS shutter display device, therefore, the rate of transmission of the light from the backlight can be increased, which allows electric power for emitting light from the backlight to be reduced significantly.

SUMMARY OF THE INVENTION

Problem to be Solved by the Invention

In the MEMS shutter display device, however, it is necessary to drive the MEMS shutters with driving signals having higher frequencies, as compared with a liquid crystal display device. In the MEMS shutter display device, an image is displayed by a field sequential color system. Further, in the MEMS shutter display device, each pixel is provided with a MEMS shutter, and the gray level value of each pixel is expressed by adjusting the open/close time of the MEMS shutter provided in each pixel. In the MEMS shutter display device, therefore, as the number of gray level values (or the number of colors, the number of bits) to be expressed by each pixel increases, the MEMS shutter has to be driven with a driving signal having a higher frequency. In other words, in the MEMS shutter display device, in a case where a greater number of the gray level values (or the number of colors, the number of bits) are to be expressed by each pixel, an increase in the electric power consumption is a problem to be solved.

Then, in light of the above-described problem, it is an object of the present invention to provide a display device in which, the electric power consumption to drive optical modulation elements (for example, MEMS shutters) is reduced.

Means to Solve the Problem

To solve the above-described problem, the first configuration is a display device that includes a backlight unit, a display panel unit, a source driver, and a controller.

The backlight unit includes a light source.

The display panel unit includes a plurality of first segmented regions, each of the first segmented regions including: a plurality of pixels each of which includes an optical modulation element that performs modulation control with respect to light emitted from the backlight unit; and a segmented gate driver for controlling the optical modulation elements of the pixels.

The source driver is a driver for controlling the optical modulation elements of the pixels.

The controller controls the light source, the segmented gate drivers, and the source driver.

Effect of the Invention

With the present invention, it is possible to provide a display device in which the electric power consumption when the optical modulation elements (for example, MEMS shutters) are driven is reduced.

MODE FOR CARRYING OUT THE INVENTION

Embodiment 1

Figure 1:
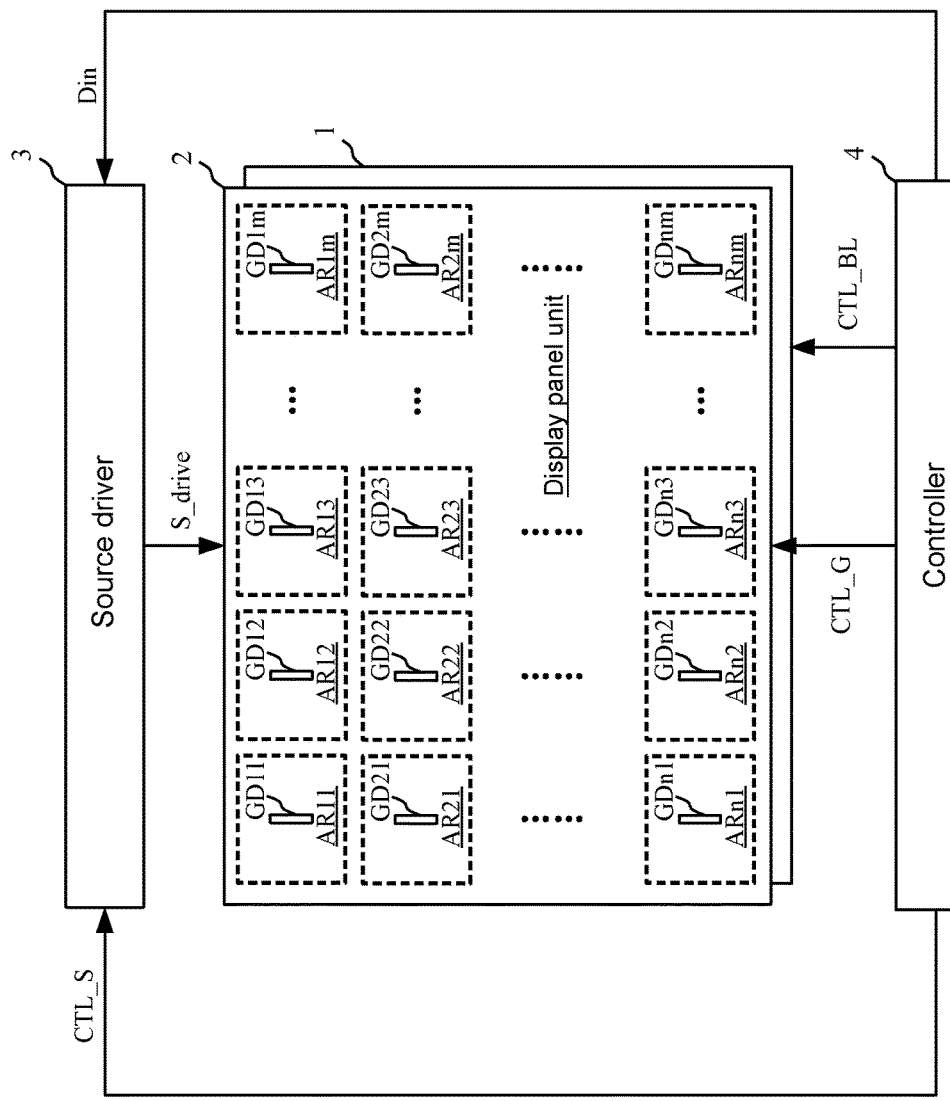
FIG. 1 illustrates a schematic configuration of a display device 1000 according to Embodiment 1.

The following description describes Embodiment 1, while referring to the drawings.

<1.1: Configuration of Display Device>

FIG. 1 illustrates a schematic configuration of a display device 1000 according, to Embodiment 1.

Figure 2:
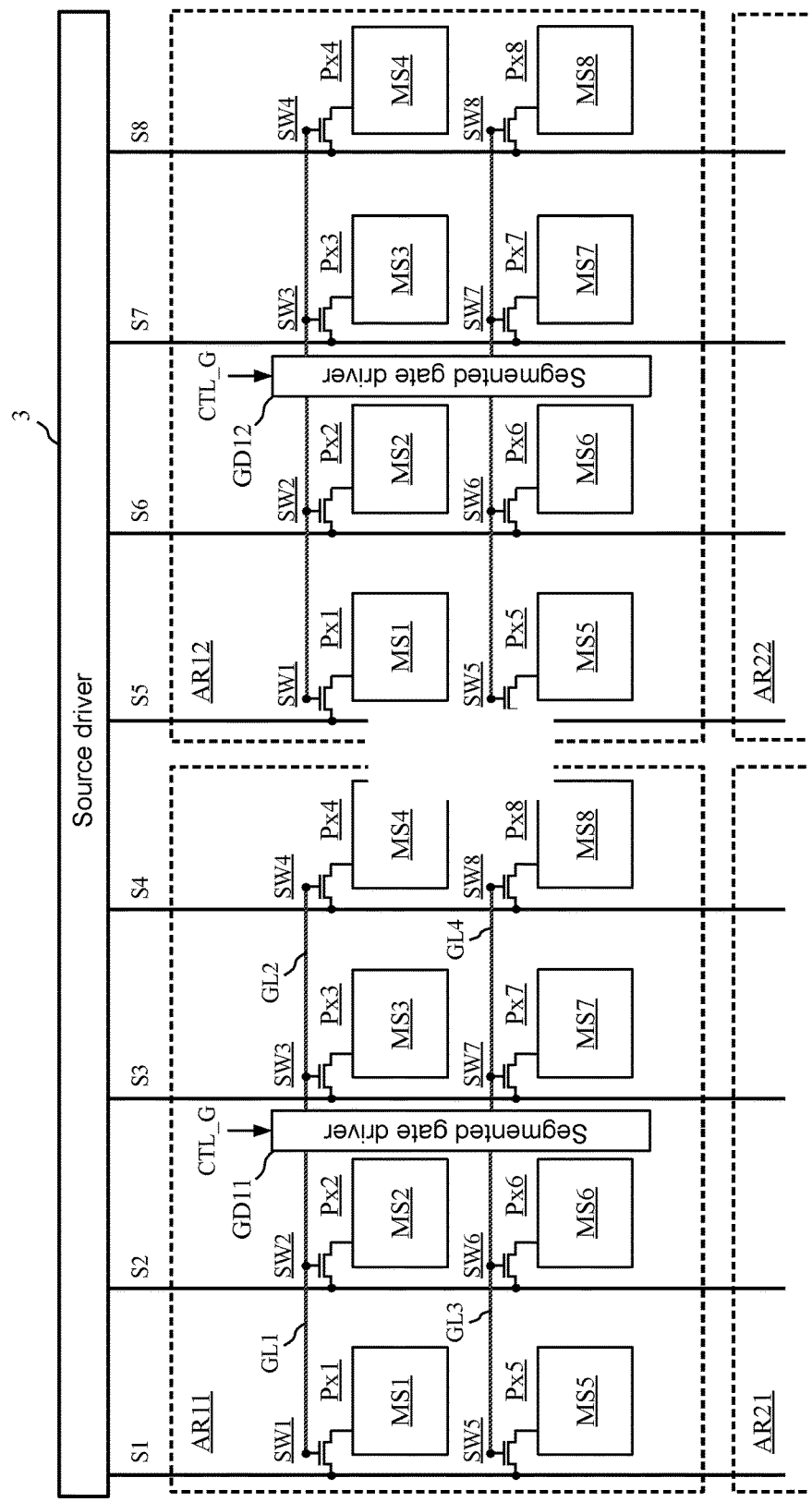
FIG. 2 illustrates a schematic configuration of a source driver 3, and segmented pixel regions AR11, AR12.

FIG. 2 illustrates a schematic configuration of a source driver 3 and segmented pixel regions AR11, AR12.

Figure 3:
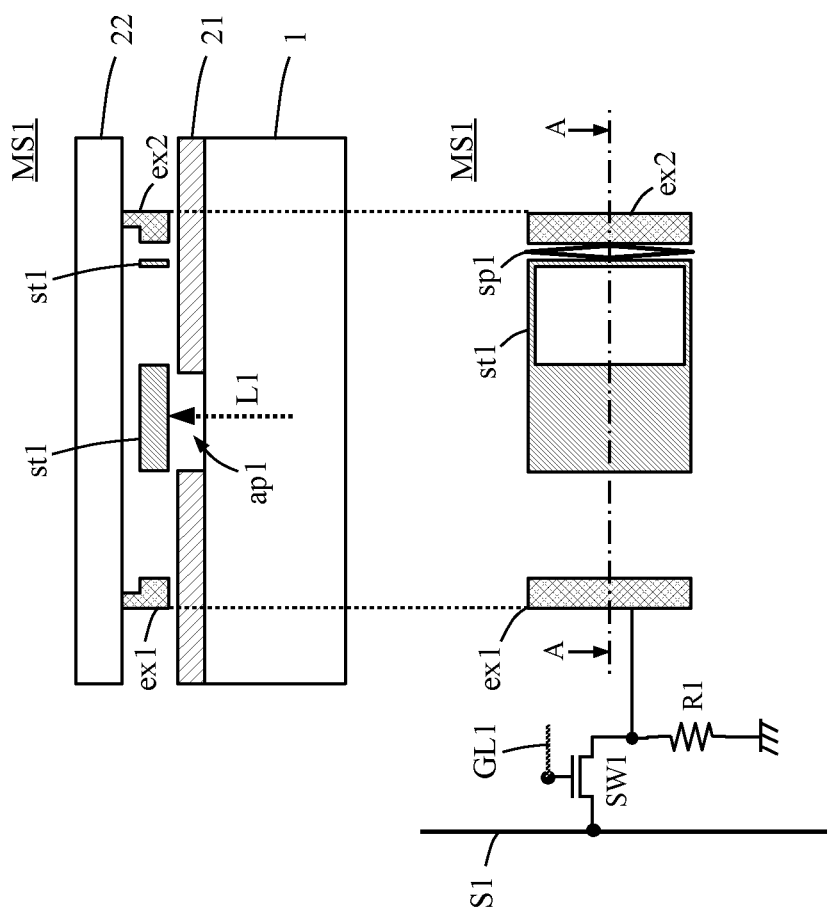
FIG. 3 illustrates a schematic configuration of an optical modulation element portion MS1 in a case where light from a backlight unit 1 is projected to outside.

FIG. 3 illustrates a schematic configuration of an optical modulation element portion MS1 in a case where light from a backlight unit 1 is projected to outside. The upper diagram of FIG. 3 is a schematic cross-sectional view taken along the line A-A in the lower diagram in FIG. 3.

Figure 4:
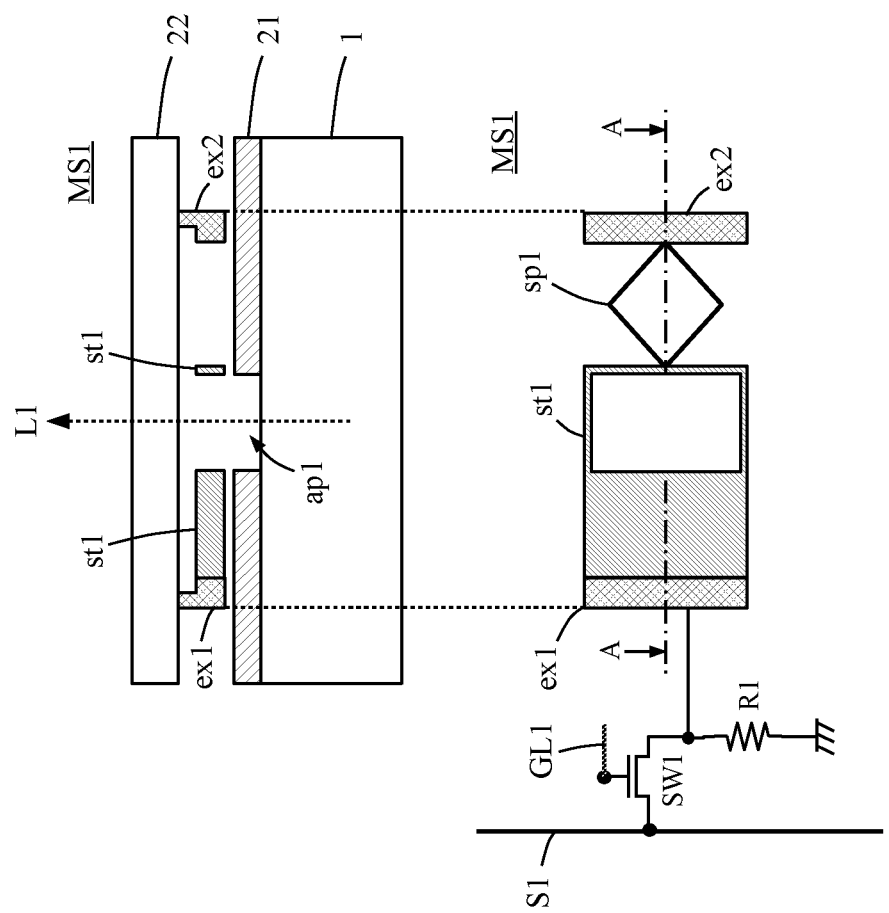
FIG. 4 illustrates a schematic configuration of the optical modulation element portion MS1 in a case where light from the backlight unit 1 is not projected to outside.

FIG. 4 illustrates a schematic configuration of the optical modulation element portion MS1 in a case where light from the backlight unit 1 is not projected to outside. The upper diagram of FIG. 4 is a schematic cross-sectional view taken along the line A-A in the lower diagram in FIG. 4.

The display device 1000 includes the backlight unit 1, a display panel unit 2, a source driver 3, and a controller 4, as illustrated in, FIG. 1.

The backlight unit 1 includes a light source (not illustrated), and projects light emitted from the light source to the display panel unit 2. The light source is composed of, for example, a red color light-emitting diode, a green color light-emitting diode, and a blue color light-emitting diode. The light source of the backlight unit 1 is controlled according to a backlight control signal CTL_BL sent form the controller 4.

The display panel unit 2 includes segmented pixel regions AR11 to ARnm, the number of which is n×m (n, m: natural numbers), as illustrated in FIG. 1.

Each segmented pixel region includes a segmented gate driver and a plurality of pixels, as illustrated in FIGS. 1 and 2. One pixel includes a switching element SWk (k: natural number) and an optical modulation element portion MSk (k: natural number), as illustrated in FIG. 2. The switching element SWk is, for example, a thin film transistor (TFT) element.

For convenience of description, a case where one segmented pixel region includes one segmented gate driver and eight pixels is described. Further, in the description, it is assumed that the switching element SWk is a thin film transistor (TFT) element.

The configuration of the segmented pixel region is described with reference to a segmented pixel region AR11 illustrated in FIG. 2 as an example.

The segmented pixel region AR11 includes a segmented gate driver GD11 and eight pixels, as illustrated in FIG. 2. For convenience sake, the eight segmented pixels in pixel region AR11 in FIG. 2 are referred to as first to eighth pixels, and are denoted by Px1 to Px8, respectively. The k-th pixel Pxk (k: natural number, 1≤k≤8) is a pixel that includes a switching element SWk and an optical modulation element portion MSk.

Hereinafter, the switching element SWk of the k-th pixel in the segmented pixel region AR11 is denoted as "SWk (AR11)", and the optical modulation element portion MSk of the k-th pixel in the segmented pixel region AR11 is denoted as "MSk(AR11)".

The segmented gate driver GD11 is connected to the gate of the switching element SWk of each pixel via four gate lines GL1 to GL4, as illustrated in FIG. 2. The segmented gate driver GD11 inputs a gate control signal CTL_G output from the controller 4. The segmented gate driver GD11 outputs the gate driving signal via the gate lines at predetermined timings based on the gate control signal CTL_G, thereby turning on the switching element SWk of each pixel.

As illustrated in FIG. 2, the first pixel Px1 includes a switching element SW and an optical modulation element portion MS1.

As illustrated in FIG. 2, the switching element SW1 has such a configuration that the source thereof is connected via the source line S1 to the source driver 3. Further, the drain of the switching element SW1 is connected to the optical modulation element portion MS1.

As illustrated in FIG. 3, the optical modulation element portion MS1 is arranged on a display surface side (cover layer 22 side) of an opening part ap1 provided in a light-shielding layer 21 formed in an upper part (display surface side) of the backlight unit 1. As illustrated in FIG. 3, the optical modulation element portion MS1 includes a first electrode ex1, a second electrode ex2, a shutter portion st1, and an elastic portion sp1.

As illustrated in FIG. 3, the first electrode ex1 is connected to the drain of the switching element SW1. The first electrode ex1, for example, is fixed to the cover layer 22, as illustrated in FIG. 3. The first electrode ex1 comes to have a positive potential, when, for example, the switching element SW1 is turned on in response to a gate driving signal, and an electric current (source driving electric current) corresponding to the source driving signal flows via the source line S1 from the switching element SW1 to a resistance R1. In other words, in this case, the first electrode ex1 is in a state where positive charges are held.

Further, when the switching element SW1 is in an off state, or when the source driving electric current does not flow from the switching element SW1 to the resistance R1, the first electrode ex1 has a zero potential (GND potential). In other words, in this case, the first electrode ex1 is in a state where no charge is kept.

As illustrated in FIG. 3, when viewed in a plan view, the second electrode ex2 is arranged so that the opening part ap1 is interposed between the second electrode ex2 and the first electrode ex1. The second electrode ex2, for example, is fixed to the cover layer 22 as illustrated in FIG. 3. Further, the second electrode ex2 is connected with the elastic portion sp1 as illustrated in FIG. 3. The second electrode ex2, for example, is connected to a power source having a negative potential or the like via a resistance (not illustrated) so as to have a negative potential, for example.

The shutter portion st1 is made of a light-blocking material, and has an opening for allowing light from the backlight unit 1 to pass therethrough, as illustrated in FIG. 3. Further, the shutter portion st1 is connected with the elastic portion sp1, which is conductive. The shutter portion st1 is connected with the second electrode ex2 having a negative potential, via the elastic portion sp1, thereby having a negative potential. In other words, in a case where the second electrode ex2 has a negative potential, the shutter portion st1 is in a state where negative charges are held.

The elastic portion sp1 is made of a conductive material, and is connected to the shutter portion st1 and the second electrode ex2. The elastic portion sp1 has elasticity, and assumes a state illustrated in FIG. 3 (a state where the shutter is closed), when no electromagnetic force is exerted between the shutter portion st1 and the first electrode ex1.

Further, in a case where charges held in the first electrode ex1 and charges held in the shutter portion st1 are different, the elastic portion sp1 assumes a state illustrated in FIG. 4 (a state where the shutter is open), due to an attractive force exerted between the first electrode ex1 and the shutter portion st1.

In this way, in the optical modulation element portion MS1, by causing the switching element SW1 to be turned on so as to cause a source driving electric current to flow, the first electrode ex1 can be charged positively, which causes the negatively charged shutter portion st1 to move so as to shift into a state illustrated in FIG. 4. In other words, by doing as described above, the shutter can be caused to shift to an open state. When the optical modulation element portion MS1 assumes this state, the light from the backlight unit 1 is caused to pass through the same toward the outside.

On the other hand, in the optical modulation element portion MS1, by turning the switching element SW1 off, or causing the source driving electric current not to flow, the first electrode ex1 is caused to have a zero potential, whereby the electromagnetic force exerted between the first electrode ex1 and the shutter portion st1 is caused to disappear. This allows the shutter portion st1 to return to the position of the steady state illustrated in FIG. 3.

The optical modulation element portion MS1 of the first pixel Px1 has the configuration as described above.

The second to eighth pixels Px2 to Px8 have configurations identical to that of the first pixel Px1 described above.

source driver 3 inputs a source control signal CTL_S output from the controller 4 and display data D1 output from the controller 4, as illustrated in FIG. 1. The source driver 3 generates source driving signals for source lines S1 to Sm, respectively, based on the source control signal CTL_S and the display data D1, and outputs the generated source driving signals via the source lines S1 to Sm to the display panel unit 2.

The controller 4 outputs, to the backlight unit 1, a backlight control signal CTL_BL for controlling the light emission of the backlight of the backlight unit 1.

Further, the controller 4 outputs, to the segmented gate drivers GD11 to GDnm of the display panel unit 2, a gate control signal for controlling the segmented gate drivers GD11 to GDnm of the display panel unit 2.

Further, the controller 4 outputs the display data D1 to be displayed by the display panel unit 2, to the source driver 3.

<1.2: Operation of Display Device

The following description describes operations of the display device 1000 having a configuration as described above.

Figure 5:
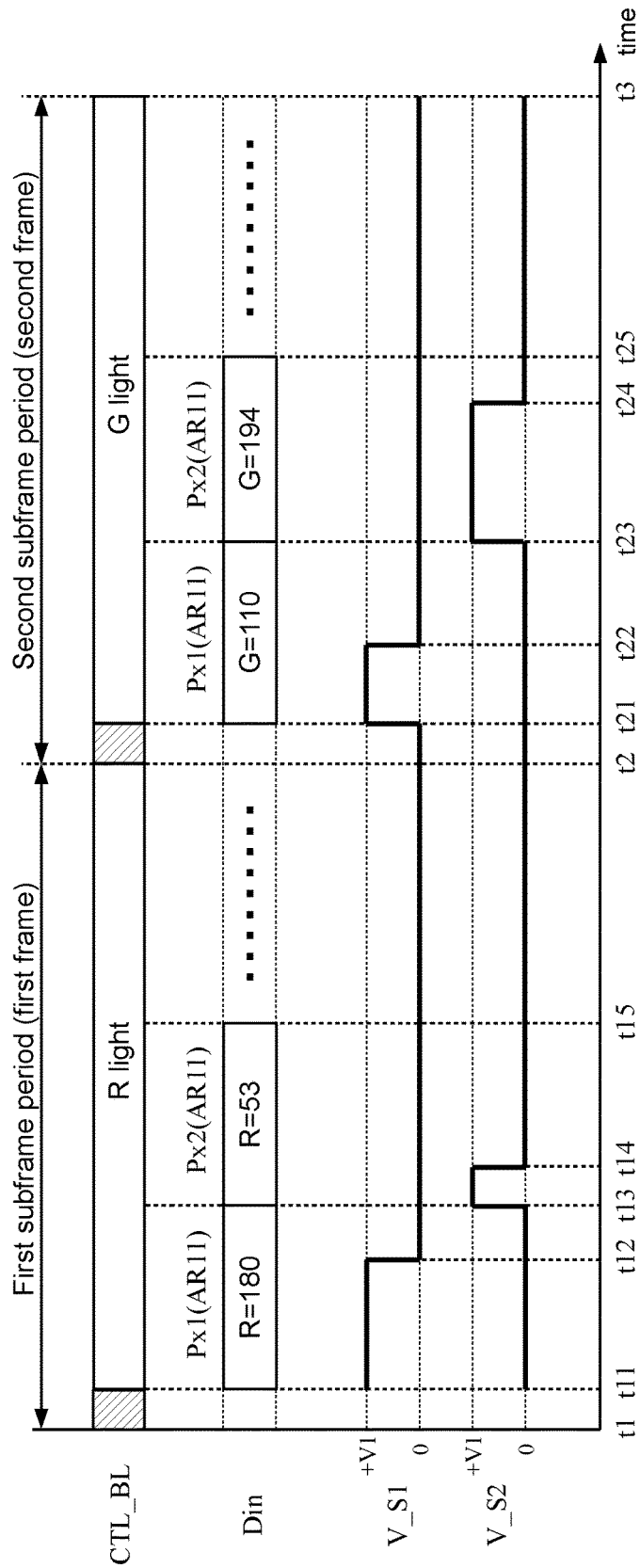
FIG. 5 is a timing chart (example) that illustrate the relationship among a backlight control signal CTL_BL, display data (image data) Din, a source driving signal V_S1 (a source driving signal output via a source line S1), and a source driving signal V_S2 (a source driving signal output via a source line S2) in a case where the display device 1000 is caused to display image data.
Figure 6:
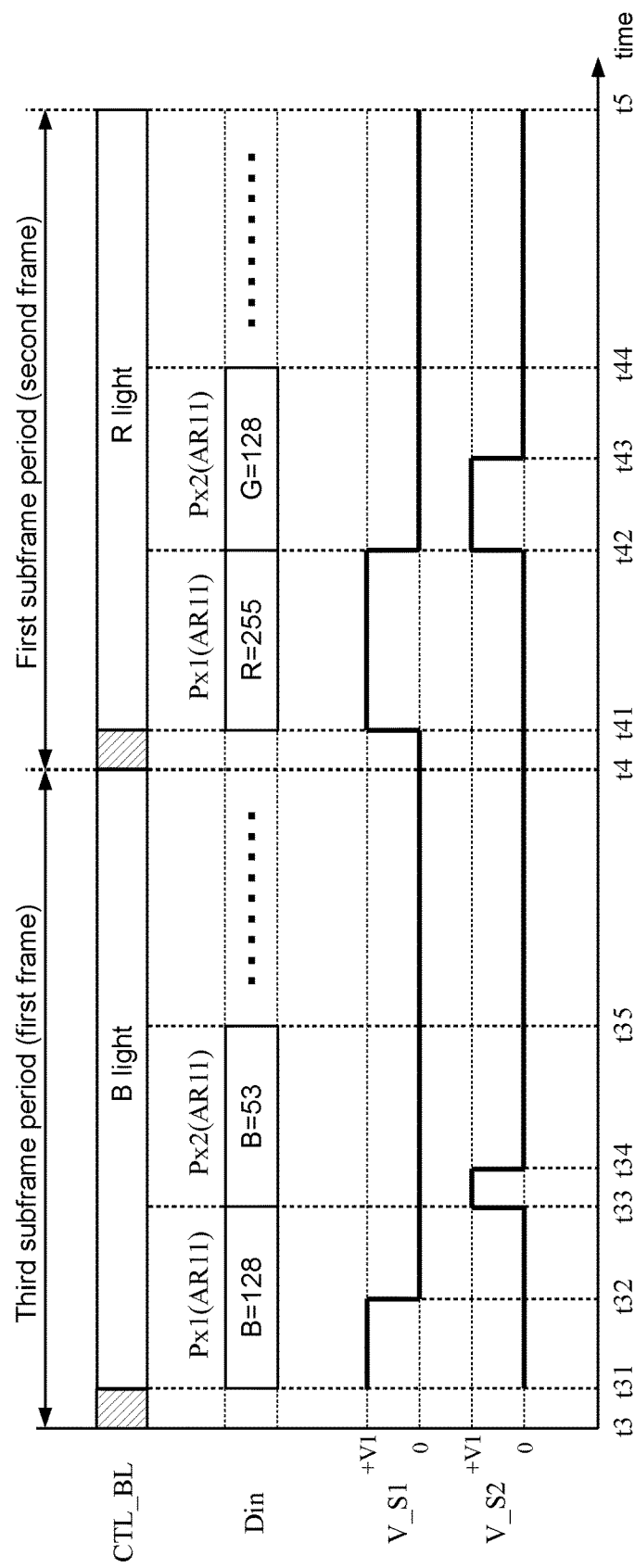
FIG. 6 is a timing chart (example) that illustrate the relationship among the backlight control signal CTL_BL, display data (image data) Din, the source driving signal V_S1 (the source driving signal output via the source line S1), and the source driving signal V_S2 (the source driving signal output via the source line S2) in a case where the display device 1000 is caused to display image data.

FIGS. 5 and 6 are timing, charts (examples) that illustrate the relationship among a backlight control signal CTL_BL, display data (image data) Din, a source driving signal V_S1 (a source driving signal output via the source line S1), and a source driving signal V_S2 (a source driving signal output via the source line S2) in a case where the display device 1000 is caused to display image data.

While referring to FIGS. 5 and 6, the following description describes, as an example, a case where, in the display device 1000, color data of 24 bits in total, composed of R component 8-bit data, G component 8-bit data, and B component 8-bit data (color data of R, G, B at 256 gray levels each) are displayed by the field sequential color method at each pixel.

More specifically, as an example, a case is described where (1) in a first frame, a gray level value of "180" of the R component, a gray level value of "110" of the a G component, and a gray level value of "128" of the B component are displayed at a first pixel Px1 in a segmented pixel region AR11 (this pixel is denoted as "Px1(AR11)"), and (2) in the first frame, a gray level value of "53" of the R component, a gray level value of "194" of the G component, and a gray level value of "53" of the B component are displayed at a second pixel Px2 in a segmented pixel region AR11 (this pixel is denoted as "Px2(AR11)").

<<Display of R Component Image (Subframe Image)>>
(Period from t1 to t11):

During a period from time t1 to time t11, the controller 4 outputs, to the backlight unit 1, a backlight control signal CTL_BL that instructs the light source of the backlight unit 1 to shift to a state of being turned off. The backlight unit 1 causes the light source of the backlight unit 1 to shift to a state of being turned off, based on the backlight control signal CTL_BL from the controller 4.

The controller 4 outputs, to the source driver 3, image data Din that are to be displayed as a first frame image. More specifically, the controller 4 outputs, to the source driver 3, a red color component image (hereinafter referred to as "R component image") of the first frame image that is to be displayed during a first subframe period of a first frame. It should be noted that one frame image is assumed to be composed of a red color component image, a green color component image (hereinafter referred to as "G component image"), and a blue color component image (hereinafter referred tows "B component image").

Based on the pixel value of each pixel of the R component image of the first frame, the controller 4 decides an initial state of the shutter portion st1 of the optical modulation element portion of each pixel in the display panel unit 2, and controls the source driver 3 with the source control signal CTL_S so that the decided initial state is achieved.

More specifically, the controller 4 controls the source driver 3 with the source control signal CTL_S, so as to: (1) cause the optical modulation element portion of the pixel in the display panel unit 2 corresponding to a pixel having a pixel value of "0" as the pixel value of the R component image in the first frame to shift to a state where the shutter is closed; and (2) cause the optical modulation element portion of the pixel in the display panel unit 2 corresponding to a pixel having a pixel value of not "0" as the pixel value of the R component image in the first frame to shift to a state where the shutter is open.

Further, in order that all of the pixels in the display panel unit 2 shift to the decided initial state as described above, the controller 4 outputs the gate control signal CTL_G for controlling the segmented gate drivers GD11 to GDnm in the display panel unit 2, to the segmented gate drivers GD11 to GDnm in the display panel unit 2. More specifically, the controller 4 controls the segmented gate drivers GD11 to GDnm so that the same output a gate driving signal so that switching elements of the pixels of the respective lines in the display panel unit 2 are turned on line-sequentially (or point-sequentially).

The source driver 3 and the segmented gate drivers GD11 to GDnm are controlled by the controller 4 in this way, whereby the optical modulation element portions of all of the pixels in the display panel unit 2 are set to the initial state. In other words, the initial state is set so that: (1) the optical modulation element portion of the pixel in the display panel unit 2 corresponding to a pixel having a pixel value of "0" as the pixel value of the R component image in the first frame shifts to a state where the shutter is closed; and (2) the optical modulation element portion of the pixel in the display panel unit 2 corresponding to a pixel having a pixel value of not "0" as the pixel value of the R component image in the first frame shifts to a state where the shutter is open.

Incidentally, in FIGS. 5 and 6, the periods from t1 to t11, from t2 to t21, from t3 to t31, and from t4 to t41 for setting the optical modulation element portions of all of the pixels in the display panel unit 2 are illustrated as periods shorter than actual periods, for want of space.

The reason why the light source of the backlight unit 1 is in a state of being turned off while the optical modulation element portions of all of the pixels in the display panel unit 2 are set to the initial state is as follows: if the light source of the backlight unit 1 is turned on when the shutter portion st1 of the optical modulation element portion is performing an opening/closing operation, the brightness of an image (video image) displayed on the display panel unit 2 is visually recognized as if it changed, due to the light emitted from the display panel unit 2 during the opening/closing operation of the shutter portion st1 of the optical modulation element portion, and this adversely affects the display quality (in particular, the hue).

(Period from t11 to t13):

At time t11, the controller 4 outputs, to the backlight unit 1, the backlight control signal CTL_BL that instructs the backlight unit 1 to turn on the light source (the light source that emits red color light), so as to shift to a state where red color light is projected. Based on the backlight control signal CTL_BL from the controller 4, the backlight unit 1 turns on the light source (the light source that emits red color light) of the backlight unit 1. This state (the state where the light source of red color light is turned on so that the red color light is emitted) is maintained during a period from t11 to t2.

At time t11, the segmented gate driver GD11 outputs a gate driving signal via the gate line GL1 so as to turn on the switching element SW1. Then, the source driver 3 outputs a source driving signal (a source driving voltage V_S1) via the source line S1 during the period from t11 to t12 so that the source driving electric current flows through the switching element SW1 and the resistance R1. This allows the optical modulation element portion MS1 of the first pixel Px1 in the segmented pixel region AR11 maintains the state where the shutter portion st1 is open during the period from t11 to t12.

At time t12, the source driver 3 stops the output of the source driving signal (for example, shifts the source driving voltage V_S1 to 0V), so as to, cause the first electrode ex1 of the optical modulation element portion MS1 of the first pixel Px1 to have a potential of 0V (the GND potential). This causes the attractive force exerted between the first electrode ex1 and the shutter portion st1 charged negatively to disappear, whereby the shutter portion st1 returns to the state illustrated in FIG. 3, and the optical modulation element portion MS1 of the first pixel Px1 shifts to the state where the shutter is closed.

Here, the period from t11 to t12 and the period from t11 to t13 have the following relationship in a case where the gray level value and the amount of light are in a relation of proportion:

(Period from $t11$ to $t12$)/(Period from $t11$ to $t13$)=$180/255$

Further, the periods from t1 to t13, from t13 to t15, from t21 to t23, from t23 to t25, from t31 to t33, from t33 to t35, from t41 to t42, and t42 to t44 are periods of the same duration, and a gray level value of "255" can be expressed when a state where the shutter is open is maintained throughout this period.

As described above, with a controlling operation that causes, in the first pixel Px1, a state where the shutter is open to be maintained only during the period from t11 to t12, and causes the red color light to be projected from the first pixel Px1 to outside, a R component gray level value of "180" can be expressed at the first pixel Px1.

(Period from t13 to t15):

At time t13, the segmented gate driver GD11 outputs the gate driving signal so that the switching element SW2 is turned on, via the gate line GL1. During a period from time t11 to time t15, the segmented gate driver GD11 may output the gate driving signal so that the switching elements SW1, SW2 are turned on, via the gate line GL1.

The source driver 3 outputs the source driving signal (the source driving voltage V_S2) via the source line S2 during a period from t13 to t14, so that a source driving electric current flows through the switching element SW2 and a resistance R2 (a resistance R2 (not illustrated) that is connected to the drain of the switching element SW2 and the first electrode ex1 of the second pixel Px2, with the same configuration as that of FIG. 3). This causes the optical modulation element portion MS2 of the second pixel Px2 in the segmented pixel region AR11 to maintain the state where the shutter portion st1 is open, during the period from t13 to t14.

At time t14, the source driver 3 stops the output of the source driving signal (for example, shifts the source driving voltage V_S2 to 0V), so as to cause the first electrode ex1 of the optical modulation element portion MS2 of the second pixel Px2 to have a potential of 0V (the GND potential). This causes the attractive force exerted between the first electrode ex1 and the shutter portion st1 charged negatively disappear, whereby the shutter portion st1 returns to the state illustrated in FIG. 3, and the optical modulation element portion MS1 of the second pixel Px2 shifts to the state where the shutter is closed.

Here, the period from t13 to t14 and the period from t13 to t15 have the following relationship in a case where the gray level value and the amount of light are in a relation of proportion:

(Period from $t13$ to $t14$)/(Period from $t13$ to $t15$)=$53/255$

As described above, with a controlling operation that causes, in the second pixel Px2, a state where the shutter is open is maintained only during the period from t13 to t14, and the red color light is projected from the second pixel Px2 to outside, a R component gray level value of "53" can be expressed at the second pixel Px2.

Likewise, controlling operations identical to that described above are performed so that predetermined R component gray level values are expressed at the third pixel Px3 and the fourth pixel Px4 in the segmented pixel region AR11.

Further, controlling operations identical to that described above are performed so that predetermined R component gray level values are expressed at the first to fourth pixels in the segmented pixel region AR12, the first to fourth pixels in the segmented pixel region AR13, . . . and the first to fourth pixels in the segmented pixel region AR1m.

Thus, the driving with respect to the pixels on the first line of the display panel unit 2 is completed.

Next, the pixels on the second line are driven by identical controlling operations.

More specifically, controlling operations identical to that described above are performed so that predetermined R component gray level values are expressed at the fifth to eights pixels in the segmented pixel region AR11, the fifth to eight pixels in the segmented pixel region AR12, and the fifth to eighth pixels in the segmented pixel region AR1m.

Likewise, the pixels on the third and fourth lines are driven by performing controlling operations identical to that described above in the segmented pixel regions AR21 to AR2m.

The same processing is applied to the subsequent lines, whereby all of the pixels in the display panel unit 2 are driven in the same manner. With this, during the first subframe period from t1 to t2, the R component subframe image is displayed by the display panel unit 2.

<<Display of G Component Image (Subframe Image)>>

(Period from t2 to t21):

During a period from time t2 to time t21, the controller 4 outputs, to the backlight unit 1, a backlight control signal CTL_BL that instructs the light source of the backlight unit 1 to shift to a state of being turned off. The backlight unit 1 causes the light source of the backlight unit 1 to shift to a state of being turned off, based on the backlight control signal CTL_BL from the controller 4.

The controller 4 outputs, to the source driver 3, image data Din that are to be displayed as a first frame image. More specifically, the controller 4 outputs, to the source driver 3, a G component image of the first frame image that is to be displayed during a second subframe period of the first frame.

Based on the pixel value of each pixel of the G component image of the first frame, the controller 4 decides an initial state of the shutter portion st1 of the optical modulation element portion of each pixel in the display panel unit 2, and controls the source driver 3 with the source control signal CTL_S so that the decided initial state is achieved.

More specifically, the controller 4 controls the source driver 3 with the source control signal CTL_S, so as to: (1) cause the optical modulation element portion of, the pixel in the display panel unit 2 corresponding to a pixel having a pixel value of "0" as the pixel value of the G component image in the first frame to shift to a state where the shutter is closed; and (2) cause the optical modulation element portion of the pixel in the display panel unit 2 corresponding to a pixel having a pixel value of not "0" as the pixel value of the G component image in the first frame to shift to a state where the shutter is open.

Further, in order that all of the pixels in the display panel unit 2 shift to the decided initial state as described above, the controller 4 outputs the gate control signal CTL_G for controlling the segmented gate drivers GD11 to GDnm in the display panel unit 2, to the segmented gate drivers GD11 to GDnm in the display panel unit 2. More specifically, the controller 4 controls the segmented gate drivers GD11 to GDnm so that the same output a gate driving signal so that switching elements of the pixels of the respective lines in the display panel unit 2 are turned on line-sequentially (or point-sequentially).

The source driver 3 and the segmented gate drivers GD11 to GDnm are controlled by the controller 4 in this way, whereby the optical modulation element portions of all of the pixels in the display panel unit 2 are set to the initial state. In other words, the initial state is set so that (1) the optical modulation element portion of the pixel in the display panel unit 2 corresponding to a pixel having a pixel value of "0" as the pixel value of the G component image in the first frame shifts to a state where the shutter is closed; and (2) the optical modulation element portion of the pixel in the display panel unit 2 corresponding to a pixel having a pixel value of not "0" as the pixel value of the G component image in the first frame shifts to a state where the shutter is open.

(Period from t21 to t23):

At time t21, the controller 4 outputs, to the backlight unit 1, the backlight control signal CTL_BL that instructs the backlight unit 1 to turn on the light source (the light source that emits green color light), so as to shift to a state where green color light is projected. Based on the backlight control signal CTL_BL from the controller 4, the backlight unit 1 turns on the light source (the light source that emits green color light) of the backlight unit 1. This state (the state where the light source of green color light is turned on so that the green color light is emitted) is maintained during a period from t21 to t3.

At time t21, the segmented gate driver GD11 outputs a gate driving signal via the gate line GL1 so as to turn on the switching element SW1. Then, the source driver 3 outputs a source driving signal (a source driving voltage V_S1) via the source line S1 during the period from t21 to t22 so that the source driving electric current flows through the switching element SW1 and the resistance R1. This allows the optical modulation element portion MS1 of the first pixel Px1 in the segmented pixel region AR11 maintains the state where the shutter portion st1 is open during the period from t21 to t22.

At time t22, the source driver 3 stops the output of the source driving signal (for example, shifts the source driving voltage V_S1 to 0V), so as to cause the first electrode ex1 of the optical modulation element portion MS1 of the first pixel Px1 to have a potential of 0V (the GNB potential). This causes the attractive force exerted between the first electrode ex1 and the shutter portion st1 charged negatively to disappear, whereby the shutter portion st1 returns to the state illustrated in FIG. 3, and the optical modulation element portion MS1 of the first pixel Px1 shifts to the state where the shutter is closed.

Here, the period from t21 to t22 and the period from t21 to t23 have the following relationship in a case where the gray level value and the amount of light are in a relation of proportion:

(Period from $t21$ to $t22$)/(Period from $t21$ to $t23$)=$110/255$

As described above, with a controlling operation that causes, in the first pixel Px1, a state where the shutter is open is maintained only during the period from t21 to t22, and the green color light is projected from the first pixel Px1 to outside, a G component gray level value of "110" can be expressed at the first pixel Px1.

(Period from t23 to t25):

At time t23, the segmented gate driver GD11 outputs the gate driving signal so that the switching element SW2 is turned on, via the gate line GL1. During a period from time t21 to time t25, the segmented gate driver GD11 may output the gate driving signal so that the switching elements SW1, SW2 are turned on, via the gate line GL1.

The source driver 3 outputs the source driving signal (the source driving voltage V_S2) via the source line S2 during a period from t23 to t24, so that a source driving electric current flows through the switching element SW2 and a resistance R2 (a resistance R2 (not illustrated) that is connected to the drain of the switching element SW2 and the first electrode ex1 of the second pixel Px2, with the same configuration as that of FIG. 3). This causes the optical modulation element portion MS2 of the second pixel Px2 in the segmented pixel region AR11 to maintain the state where the shutter portion st1 is open, during the period from t23 to t24.

At time t24, the source driver 3 stops the output of the source driving signal (for example, shifts the source driving voltage V_S2 to 0V), so as to cause the first electrode ex1 of the optical modulation element portion MS2 of the second pixel Px2 to have a potential of 0V (the GNB potential). This causes the attractive force exerted between the first electrode ex1 and the shutter portion st1 charged negatively disappear, whereby the shutter portion st1 returns to the state illustrated in FIG. 3, and the optical modulation element portion MS1 of the second pixel Px2 shifts to the state where the shutter is closed.

Here, the period from t23 to t24 and the period from t23 to t25 have the following relationship in a case where the gray level value and the amount of light are a relation of proportion:

(Period from $t23$ to $t24$)/(Period from $t23$ to $t25$)=$194/255$

As described above, with a controlling operation that causes, in the second pixel Px2, a state where the shutter is open is maintained only during the period from t23 to t24, and the green color light is projected from the second pixel Px2 to outside, a G component gray level value of "194" can be expressed at the second pixel Px2.

Likewise, controlling operations identical to that described above are performed so that predetermined G component gray level values are expressed at the third pixel Px3 and the fourth pixel Px4 in the segmented pixel region AR11.

Further, controlling operations identical to that described above are performed so that predetermined G component gray level values are expressed at the first to fourth pixels in the segmented pixel region AR12, the first to fourth pixels in the segmented pixel region AR13, . . . and the first to fourth pixels in the segmented pixel region AR1m.

Thus, the driving with respect to the pixels on the first line of the display panel unit 2 is completed.

Next, the pixels on the second line are driven by identical controlling operations.

More specifically, controlling operations identical to that described above are performed so that predetermined G component gray level values are expressed at the fifth to eights pixels in the segmented pixel region AR11 the fifth to eight pixels in the segmented pixel region AR12, . . . and the fifth to eighth pixels in the segmented pixel region AR1m.

Likewise, the pixels on the third and fourth lines is driven by performing controlling operations identical to that described above in the segmented pixel regions AR21 to AR2m.

The same processing is applied to the subsequent lines, whereby all of the pixels in the display panel unit 2 are driven in the same manner. With this, during the second subframe period from t2 to t3, the G component subframe image is displayed by the display panel unit 2.

<<Display of B Component Image (Subframe Image)>>
(Period from t3 to t31):

During a period from time t3 to time t31, the controller 4 outputs, to the backlight unit 1, a backlight control signal CTL_BL that instructs the light source of the backlight unit 1 to shift to a state of being turned off. The backlight unit 1 causes the light source of the backlight unit 1 to shift to a state of being turned off, based on the backlight control signal CTL_BL from the controller 4.

The controller 4 outputs, to the source driver 3, image data Din that are to be displayed as a first frame image. More specifically, the controller 4 outputs, to the source driver 3, a B component image of the first frame image that is to be displayed during a third subframe period of the first frame.

Based on the pixel value of each pixel of the B component image of the first frame, the controller 4 decides an initial state of the shutter portion st1 of the optical modulation element portion of each pixel in the display panel unit 2, and controls the source driver 3 with the source control signal CTL_S so that the decided initial state is achieved.

More specifically, the controller 4 controls the source driver 3 with the source control signal CTL_S, so as to: (1) cause the optical modulation element portion of the pixel in the display panel unit 2 corresponding to a pixel having a pixel value of "0" as the pixel value of the B component image in the first frame to shift to a state where the shutter is closed; and (2) cause the optical modulation element portion of the pixel in the display panel unit 2 corresponding to a pixel having a pixel value of not "0" as the pixel value of the B component image in the first frame to shift to a state where the shutter is open.

Further, in order that all of the pixels in the display panel unit 2 shift to the decided initial state as described above, the controller 4 outputs the gate control signal CTL_G for controlling the segmented gate drivers GD11 to GDnm in the display panel unit 2, to the segmented gate drivers GD11 to GDnm in the display panel unit 2. More specifically, the controller 4 controls the segmented gate drivers GD11 to GDnm so that the same output a gate driving signal so that switching elements of the pixels of the respective lines in the display panel unit 2 are turned on line-sequentially (or point-sequentially).

The source driver 3 and the segmented gate drivers GD11 to GDnm are controlled by the controller 4 in this way, whereby the optical modulation element portions of all of the pixels in the display panel unit 2 are set to the initial state. In other words, the initial state is set so that: (1) the optical modulation element portion of the pixel in the display panel unit 2 corresponding to a pixel having a pixel value of "0" as the pixel value of the B component image in the first frame shifts to a state where the shutter is closed; and (2) the optical modulation element portion of the pixel in the display panel unit 2 corresponding to a pixel having a pixel value of not "0" as the pixel value of the B component image in the first frame shifts to a state where the shutter is open.

(Period from t31 to t33):

At time t31, the controller 4 outputs, to the backlight unit 1, the backlight control signal CTL_BL that instructs the backlight unit 1 to, turn on the light source (the light source that emits blue color light), so as to shift to a state where blue color light is projected. Based on the backlight control signal CTL_BL from the controller 4, the backlight unit 1 turns on the light source (the light source that emits blue color light) of the backlight unit 1. This state (the state where the light source of blue color light is turned on so that the blue color light is emitted) is maintained during a period from t31 to t4.

At time t31, the segmented gate driver GD11 outputs a gate driving signal via the gate line GL1 so as to turn on the switching element SW1. Then, the source driver 3 outputs a source driving signal (a source driving voltage V_S1) via the source line S1 during the period from t31 to t32 so that the source driving electric current flows through the switching element SW1 and the resistance R1. This allows the optical modulation element portion MS1 of the first pixel Px1 in the segmented pixel region AR11 maintains the state where the shutter portion st1 is open during the period from t31 to t32.

At time t32, the source driver 3 stops the output of the source driving signal (for example, shifts the source driving voltage V_S1 to 0V), so as to cause the first electrode ex1 of the optical modulation element portion MS1 of the first pixel Px1 to have a potential of 0V (the GND potential). This causes the attractive force exerted between the first electrode ex1 and the shutter portion st1 charged negatively to disappear, whereby the shutter portion st1 returns to the state illustrated in FIG. 3, and the optical modulation element portion MS1 of the first pixel Px1 shifts to the state where the shutter is closed.

Here, the period from t31 to t32 and the period from t31 to t33 have the following relationship in a case where the gray level value and the amount of light are in a relation of proportion:

$$(\text{Period from } t31 \text{ to } t32)/(\text{Period from } t31 \text{ to } t33) = {}^{128}\!/\!{}_{255}$$

As described above, with a controlling operation that causes, in the first pixel Px1, a state where the shutter is open is maintained only during the period from t31 to t32, and the blue color light is projected from the first pixel Px1 to outside, a B component gray level value of "128" can be expressed at the first pixel Px1.

(Period from t33 to t35):

At time t33, the segmented gate driver GD11 outputs the gate driving signal so that the switching element SW2 is turned on, via the gate line GL1. During a period from time t31 to time t35, the segmented gate driver GD11 may output the gate driving signal so that the switching elements SW1, SW2 are turned on, via the gate line GL1.

The source driver 3 outputs the source driving signal (the source driving voltage V_S2) via the source line S2 during a period from t33 to t34, so that a source driving electric current flows through the switching element SW2 and a resistance R2 (a resistance R2 (not illustrated) that is connected to the drain of the switching element SW2 and the first electrode ex1 of the second pixel Px2, with the same configuration as that of FIG. 3). This causes the optical modulation element portion MS2 of the second pixel Px2 in the segmented pixel region AR11 to maintain the state where the shutter portion st1 is open, during the period from t33 to t34.

At time t34, the source driver 3 stops the output of the source driving signal (for example, shifts the source driving voltage V_S2 to 0V), so as to cause the first electrode ex1 of the optical modulation element portion MS2 of the second pixel Px2 to have a potential of 0V (the GND potential). This causes the attractive force exerted between the first electrode ex1 and the shutter portion st1 charged negatively disappear, whereby the shutter portion st1 returns to the state illustrated in FIG. 3, and the optical modulation element portion MS1 of the second pixel Px2 shifts to the state where the shutter is closed.

Here, the period from t33 to t34 and the period from t33 to t35 have the following relationship in a case where the gray level value and the amount of light are in a relation of proportion:

$$(\text{Period from } t33 \text{ to } t34)/(\text{Period from } t33 \text{ to } t35) = 53/255$$

As described above, with a controlling operation that causes, in the second pixel Px2, a state where the shutter is open is maintained only during the period from t33 to t34, and the blue color light is projected from the second pixel Px2 to outside, a B component gray level value of "53" can be expressed at the second pixel Px2.

Likewise, controlling operations identical to that described above are performed so that predetermined B component gray level values are expressed at the third pixel Px3 and the fourth pixel Px4 in the segmented pixel region AR11.

Further, controlling operations identical to that described above are performed so that predetermined B component gray level values are expressed at the first to fourth pixels in the segmented pixel region AR12, the first to fourth pixels in the segmented pixel region AR13, . . . and the first to fourth pixels in the segmented pixel region AR1m.

Thus, the driving with respect to the pixels on the first line of the display panel unit 2 is completed.

Next, the pixels on the second line are driven by identical controlling operations.

More specifically, controlling operations identical to that described above are performed so that predetermined B component gray level values are expressed at the fifth to eights pixels in the segmented pixel region AR11 the fifth to eight pixels in the segmented pixel region AR12, . . . and the fifth to eighth pixels in the segmented pixel region AR1m.

Likewise, the pixels on the third and fourth lines is driven by performing controlling operations identical to that described above in the segmented pixel regions AR21 to AR2m.

The same processing is applied to the subsequent lines, whereby all of the pixels in the display panel unit 2 are driven in the same manner. With this, during the third subframe period from t3 to t4, the B component subframe image is displayed by the display panel unit 2.

The processing of the frames subsequent to the second frame is performed in the same manner, whereby a frame image (video image) is displayed on the display panel unit 2 of the display device 1000.

As described above, the display device 1000 has such a configuration that the segmented gate drivers GD11 to DGnm thus segmented are arranged on the display panel unit 2. In the display device 1000, therefore, the lengths of the gate lines connected to the respective segmented gate drivers GD11 to DGnm can be significantly decreased, as compared with the lengths of the gate lines connected to the conventional gate driver (the length equivalent to pixels of about one line of the display panel unit).

In a case of a conventional gate driver, since the gate lines are long, the signal delay of the gate pulse signal and the waveform distortion (waveform roundness) had to be improved by reducing the time constants of circuits formed with a gate driver, lines, and pixels, or increasing the gate driving voltage of the gate driver. In contrast, in the case of the display device 1000, the length of the gate lines connected to the respective segmented gate drivers GD11 to DGnm can be set to significantly smaller as compared with the conventional cases, which allows a gate pulse signal (gate driving signal) having reduced signal delay or reduced waveform distortion (waveform roundness) to be output from the respective segmented gate drivers GD11 to DGnm with a low voltage. As a result, in the display device 1000, the electric power consumption in the gate driving control can be reduced, which allows the electric power consumption in the display device 1000 to be reduced as well.

Further, in the display device 1000, since the gate driver is arranged as the segmented gate drivers GD11 to DGnm within the display panel unit 2, it is not necessary to provide a space for providing a gate driver outside the display panel unit 2, which is different from the conventional display device. In the display device 1000, therefore, by providing the segmented gate drivers GD11 to DGnm within the display panel unit 2, the peripheral region (frame region) of the display panel unit 2 can be reduced in size.

Embodiment 2

The following description describes Embodiment 2.

In the following description, parts characteristic of the present embodiment are described, and detailed descriptions of parts identical to those in the above-described embodiment are omitted.

Figure 7:
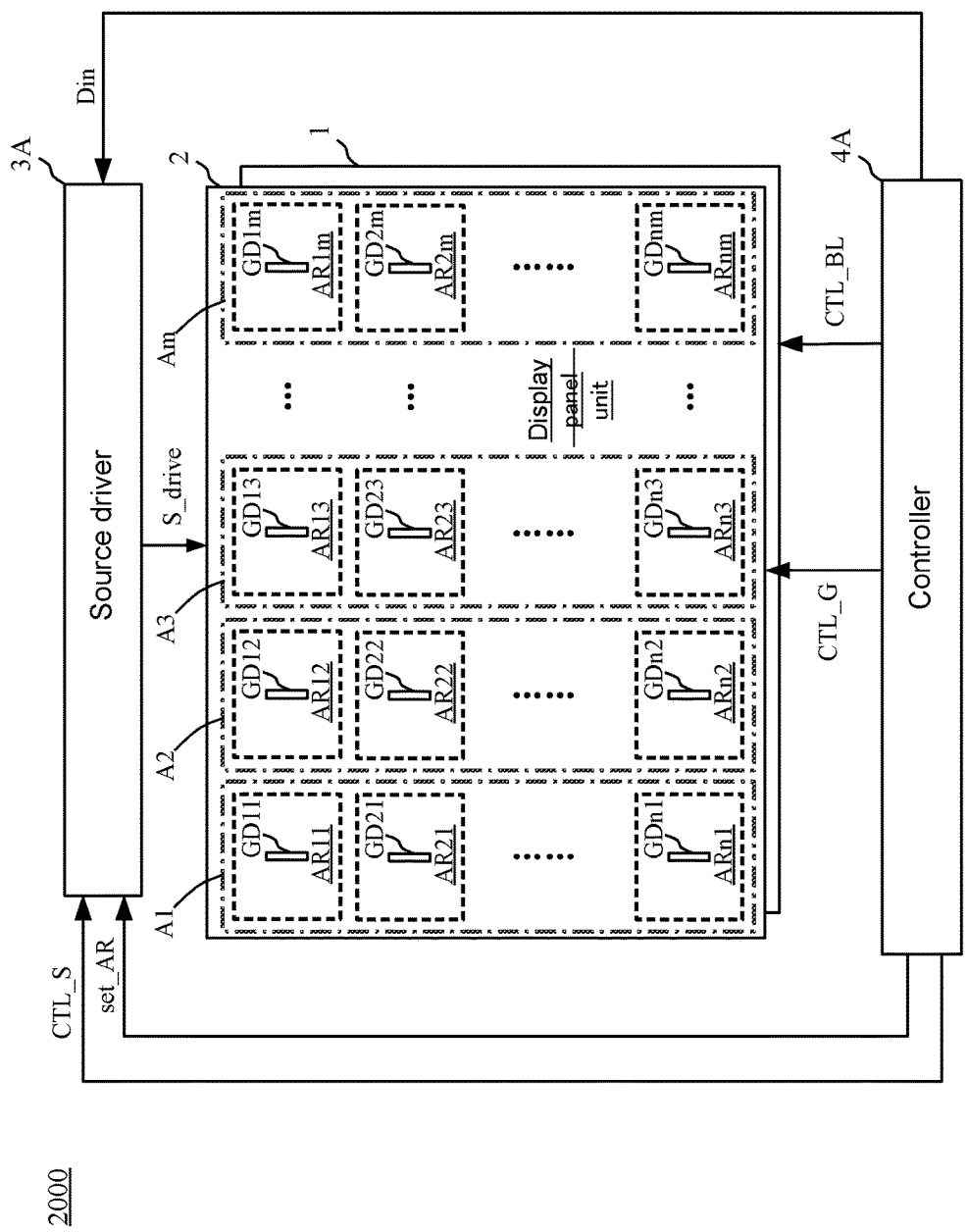
FIG. 7 illustrates a schematic configuration of a display device 2000 of Embodiment 2.

FIG. 7 illustrates a schematic configuration of a display device 2000 of Embodiment 2.

The display device 2000 of Embodiment 2 has a configuration identical to that of the display device 1000 of Embodiment 1 except that the controller 4 is replaced with a controller 4A and the source driver 3 is replaced with a source driver 3A, as illustrated in FIG. 7.

The controller 4A has a function identical to that of the controller 4 of Embodiment 1, and further, outputs an area setting signal set_AR to the source drive 3.

The controller 4A, for example, longitudinally segments the pixel area of the display panel unit 2 as illustrated in FIG. 7, thereby setting longitudinally segmented areas A1 to Am. Then, the controller 4A generates a signal containing information about the longitudinally segmented areas A1 to Am as an area setting signal set_AR. The controller 4A outputs the generated area setting signal set_AR to the source driver 3A.

The longitudinally segmented area Ak natural number, 1≤k≤m) includes segmented pixel regions AR1k to ARnk, as illustrated in FIG. 7.

The source driver 3A has a function identical to that of the source driver 3 of Embodiment 1, and further, inputs the area setting signal set_AR output from the controller 4A. Based on the area setting signal set_AR, the source driver 3A generates a source driving signal for driving each longitudinally segmented area A1 to Am of the display panel unit 2, and outputs the same via the source lines.

The following description describes a case where, for example, display colors of the longitudinally segmented areas are set as described below.

(1) The number of colors displayed in the longitudinally segmented area A1 is 27, the number of gray levels of the R component value is "3", the number of gray levels, of the G component value is "3", and the number of gray levels of the B component value is "3".

(2) The number of colors displayed in the longitudinally segmented areas A2 to A3 is 64, the number of gray levels of the R component value is "4", the number of gray levels of the G component value is "4", and the number of gray levels of the B component value is "4".

(3) The number of colors displayed in the longitudinally segmented areas A4 to Am is 16777216, the number of gray levels of the R component value is "256", the number of gray levels of the G component value is "256", and the number of gray levels of the B component value is "256".

In the above-described case, when (1) the highest frequency f1 of a source driving signal for driving the longitudinally segmented area A1, (2) the highest frequency f2 of a source driving signal for driving the longitudinally segmented areas A2 to A3, and (3) the highest frequency f3 of a source driving signal for driving the longitudinally segmented areas A4 to Am are assumed, the source driver 3A generates a source driving signal in such a manner that the following is satisfied:

$$f1=(3/256) \times f3,$$

$$f2=(4/256) \times f3,$$

$$f3=1/T1, \text{ and}$$

T1: time period having a duration of 1/256 of the duration of the period from t1 to t13 in FIG. 5

In other words, for a pixel region where the number of colors to be displayed is small, a source driving signal is generated with a lower driving frequency, whereby the electric power consumption of the display device 2000 can be reduced. In the display device 2000, the gray level value of the pixel of a display image is expressed by the length of the open/close time of the shutter portion st1 in the optical modulation element portion. Therefore, when many gray level values are to be expressed, it is necessary to control the open/close time of the shutter portion st1 in the optical modulation element portion with a driving signal having a higher frequency. On the other hand, when fewer gray level values are to be expressed, the open/close time of the shutter portion st1 can be controlled in the optical modulation element portion with a driving signal having a lower frequency, which allows the electric power consumption to be reduced.

In the display device 2000 of the present embodiment, the number of gray levels to be expressed in each pixel region can be figured out preliminarily, and the highest frequency of the source driving signal can be set according to the number of gray levels to be expressed. In other words, in the display device 2000, a pixel region in which the number of gray levels to be expressed is small can be driven with a source driving signal having a lower highest frequency, and therefore, the electric power consumption in the display device 2000 can be reduced.

The segmenting method for setting the longitudinally segmented areas is not limited to the above-described segmenting method (the segmenting method illustrated in FIG. 7), and the longitudinally segmented areas may be set by another segmenting method. For example, the longitudinally segmented areas A1 and A2 in FIG. 7 may be set as one longitudinally segmented area, and likewise, the longitudinally segmented areas Ak and Ak+1 in FIG. 7 may be set as one longitudinally segmented area. Further, for example, an arbitrary number of longitudinally segmented areas among the longitudinally segmented areas A1 to Am in FIG. 7 may be set as one segmented area.

Embodiment 3

The following description describes Embodiment 3.

In the following description, parts characteristic of the present embodiment are described, and detailed descriptions of parts identical to those in the above-described embodiments are omitted.

Figure 8:
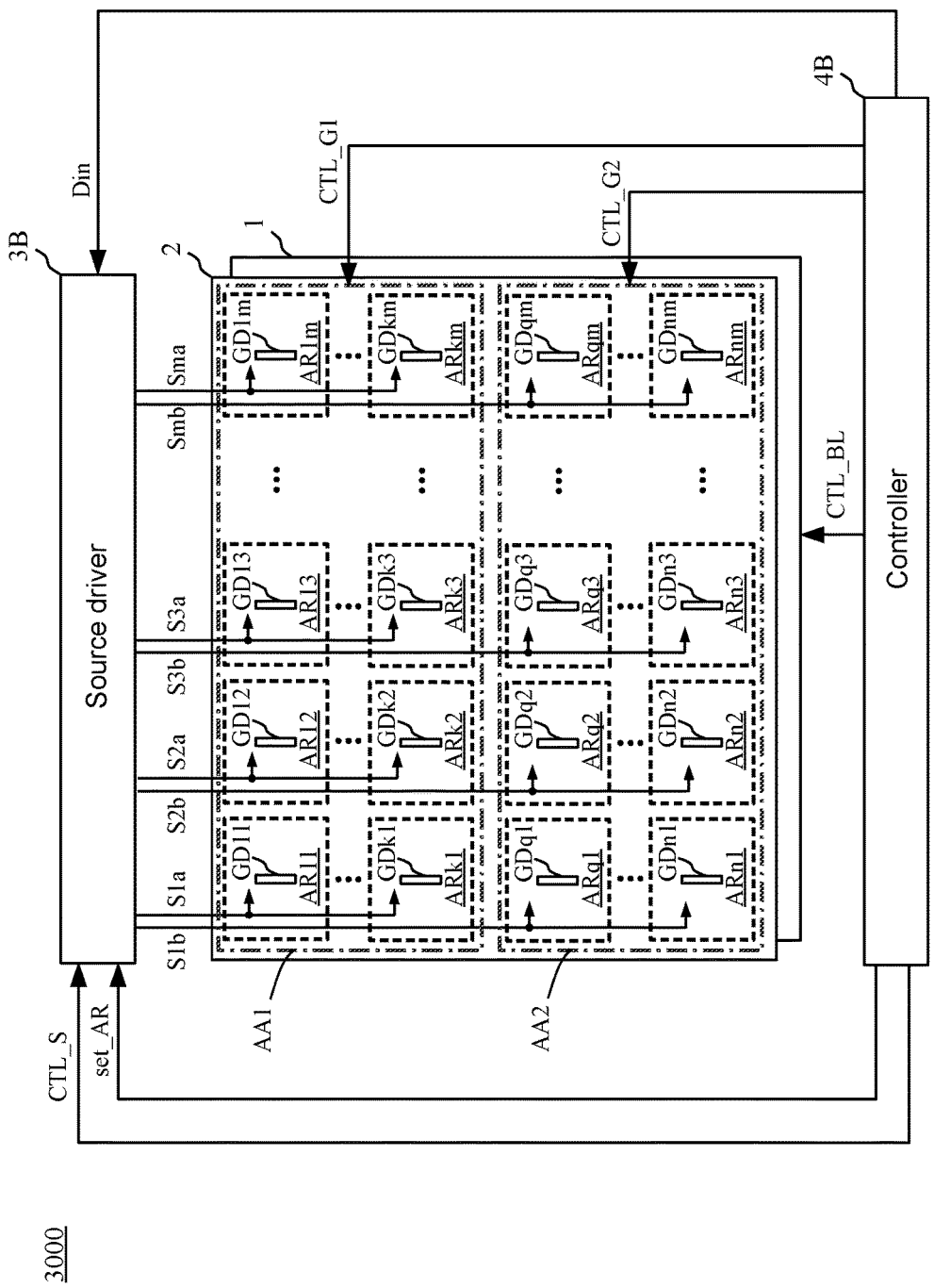
FIG. 8 illustrates a schematic configuration of a display device 3000 of Embodiment 3.

FIG. 8 illustrates a schematic configuration of a display device 3000 of Embodiment 3.

The display device 3000 of Embodiment 3 has a configuration identical to that of the display device 2000 of Embodiment 2 except that the controller 4A is replaced with a controller 4B and the source driver 3A is replaced with a source driver 3B, as illustrated in FIG. 8.

The controller 4B has a function identical to that of the controller 4A of Embodiment 2. The controller 4B outputs gate control signals that are generated for respective horizontally segmented areas, to the display panel unit 2, as illustrated in FIG. 8. The present embodiment is described by referring to an exemplary case where, as illustrated in FIG. 8, the pixel region is segmented into two in the horizontal direction so that horizontally segmented areas AA1 and AA2 are set.

The controller 4B outputs, to the display panel unit 2, a gate control signal CTL_G1 for controlling segmented gate drivers GD11 to GDkm included in a horizontally segmented area AA1, and a gate control signal CTL_G2 for controlling segmented gate drivers GDq1 to GDnm included in a horizontally segmented area AA2.

The subscripts k and q are natural numbers satisfying:

$$q=k+1, \text{ and}$$

$$n=2 \times k.$$

The source driver 3A has a function identical to that of the source driver 3A of Embodiment 2. Further, the source driver 3B is connected to a source line S1a for driving segmented pixel regions AR11 to ARk1 in the horizontally segmented area AA1, and a source line S1b for driving segmented pixel regions ARq1 to ARn1 in the horizontally segmented area AA2. The source driver 3B is capable of outputting source driving signals to the source line S1a and the source line S1b independently. The source driver 3B, therefore, is capable of outputting source driving signals for driving the segmented pixel regions AR11 to ARk1 via the source line S1a, while outputting source driving signals for driving the segmented pixel regions ARq1 to ARn1 via the source line S1b.

Further, the source driver 3B is connected to a source line S2a for driving the segmented pixel regions AR12 to ARk2 in the horizontally segmented area AA1, and a source line S2b for driving the segmented pixel regions ARq2 to ARn2 in the horizontally segmented area AA2. The source driver 3B is capable of outputting source driving signals to the source line S2a and the source line S2b independently. The source driver 3B, therefore, is capable of outputting source driving signals for driving the segmented pixel regions AR12 to ARk2 via the source line S2a, while outputting source driving signals for driving the segmented pixel regions ARq2 to ARn2 via the source line S2b.

Likewise the source driver 3B is connected to source lines Sja for driving the segmented pixel regions AR1j to ARkj (j: natural number, 1≤j≤m) in the horizontally segmented area AA1, and source lines Sjb for driving the segmented pixel regions ARqj to ARnj in the horizontally segmented area AA2. The source driver 3B is capable of outputting source driving signals to the source lines Sja and the source lines Sjb independently. The source driver 3B, therefore, is capable of outputting source driving signals for driving the segmented pixel regions AR1j to ARkj via the source lines Sja, while outputting source driving signals for driving the segmented pixel regions ARqj to ARnj via the source lines Sjb.

In this way, in the display device 3000, the horizontally segmented area AA1 and the horizontally segmented area AA2 can be driven in parallel by the source driver 3B.

With this configuration, in the display device 3000, a period of time (the periods from t1 to t11 and from t2 to t21 in FIG. 5, as well as the periods from t3 to t31 and from t4 to t41 in FIG. 6) for setting the optical modulation element portions of all of the pixels in the display panel unit 2 to the initial state can be decreased.

For example, in the display device 1000 in Embodiment 1, in order to set the optical modulation element portions of all of the pixels in the display panel unit 2 to the initial state, it is necessary to perform gate driving with respect to all of the lines line-sequentially. The gate driving time in this case is assumed to be "tg1".

In the display device 3000 in the present embodiment, the gate driving of the horizontally segmented area AA1 can be performed with the gate control signal CTL_G1, and at the same time, the gate driving of the horizontally segmented area M2 can be performed with the gate control signal CTL_G2. In other words, in the display device 3000, the gate driving of the horizontally segmented area AA1 and the gate driving of the horizontally segmented area AA2 can be simultaneously performed in parallel.

In the display device 3000, therefore, in order to set the optical modulation element portions of all of the pixels in the display panel unit 2 to the initial state, the gate driving of the lines included in the horizontally segmented area AA1 may be performed line-sequentially, and simultaneously, the gate driving of the lines included in the horizontally segmented area AA2 may be performed line-sequentially.

In other words, in the display device 3000, the period of time required for setting the optical modulation element portions of all of the pixels in the display panel unit 2 to the initial state can be assumed to be tg1/2.

With this configuration, the time of period for which the light source of the backlight unit 1 is kept in the ON state can be set longer, whereby the light emission intensity of the light source of the backlight unit 1 can be decreased, and hence, the electric power consumption of the backlight unit 1 can be reduced.

This is described below, with reference to FIG. 9.

Figure 9:
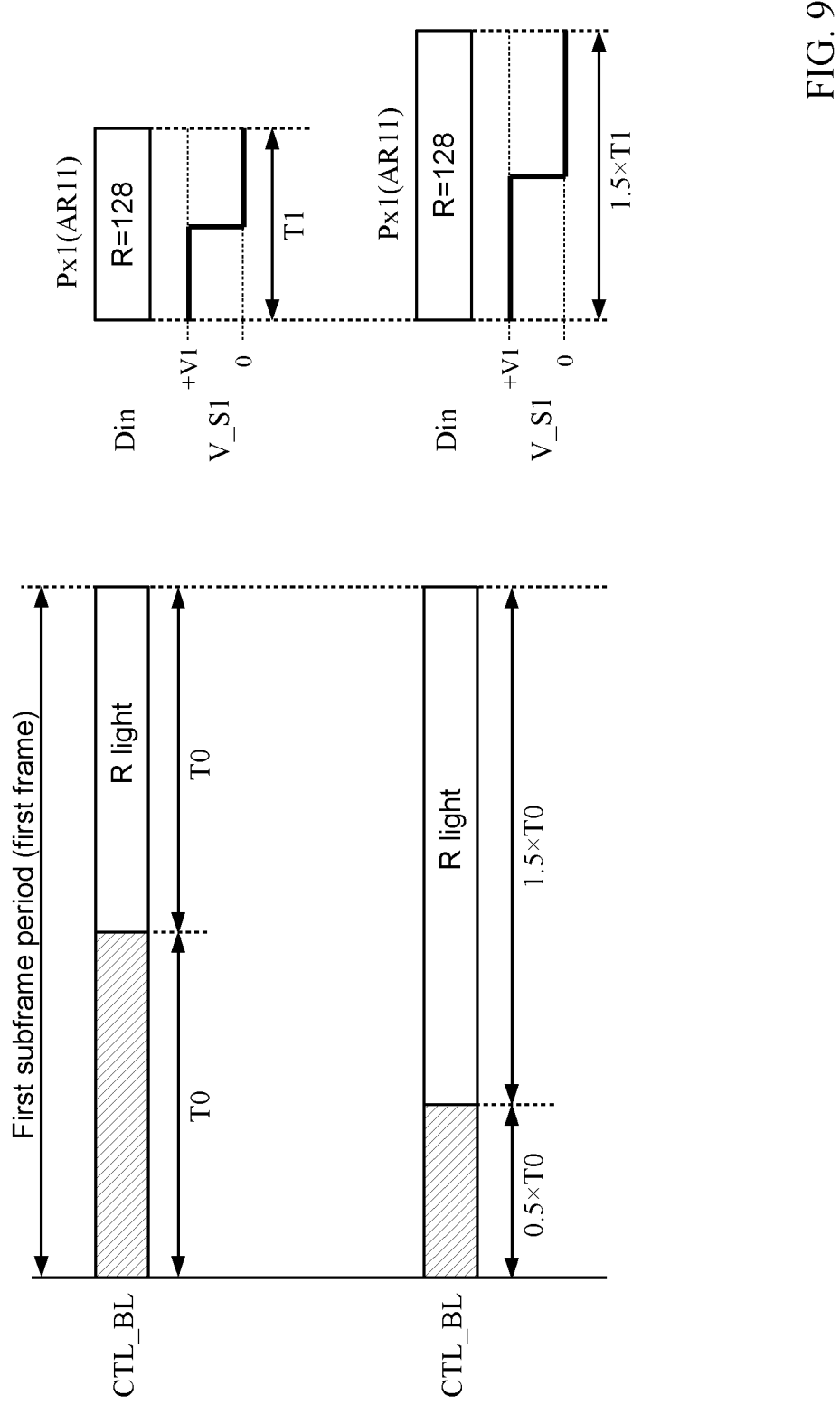
FIG. 9 is a diagram for explaining a controlling operation in a case where regions segmented in the horizontal direction are set, and the gate driving is performed with respect to the regions segmented in the horizontal direction simultaneously.

FIG. 9 is a diagram for explaining a controlling operation in a case where regions segmented in the horizontal direction are set, and the gate driving is performed with respect to the regions segmented in the horizontal direction simultaneously.

The left diagram in FIG. 9 is a timing chart that illustrates the backlight control signal CTL_BL of the display device 1000 of Embodiment 1, and the backlight control signal CTL_BL of the display device 3000 of Embodiment 3, with the time axes thereof coinciding with each other.

The upper right diagram in FIG. 9 illustrates image data Din and a source driving signal V_S1 in a case where R=128 (an R component gray level value of "128") is displayed at a first pixel Px1 in the segmented pixel region AR11 in the display device 1000 of Embodiment 1.

The right lower diagram in FIG. 9 illustrates image data Din and a source driving signal V_S1 in a case where R=128 (an R component gray level value of "128") is displayed at a first pixel Px1 in the segmented pixel region AR11 in the display device 3000 of Embodiment 3.

As is clear from FIG. 9, in the display device 3000 of Embodiment 3, in order to set the optical modulation element portions of all of the pixels of the display panel unit 2 to the initial state, it is possible to perform the gate driving with respect to the lines included in the horizontally segmented area AA1 line-sequentially, and at the same time, to perform the gate driving with respect to the lines included in the horizontally segmented area AA2 line-sequentially. In the display device 3000, therefore, the period of time required for setting the optical modulation element portions of all of the pixels in the display panel unit 2 to the initial state is half of the period of time of T0 required in the display device 1000, that is, T0/2.

Since the subframe period is constant, it is possible in the display device 3000 to set the light emission time of the light source of the backlight unit 1 longer, for the decrease in the period of time required for setting the optical modulation element portions of all of the pixels in the display panel unit 2 to the initial state. In the case of FIG. 9, the light emission time of the light source of the backlight unit 1 in the display device 3000 is 1.5 times the light emission time T0 of the light source of the backlight unit 1 in the display device 1000.

In the display device 3000, the shutter open/close time at each pixel also can be set longer in proportion to this extension rate of the light emission time of the backlight unit 1. For example, as illustrated in FIG. 9, in a case where R=128 (R component gray level value of "128") is displayed at the first pixel in the segmented pixel region AR11, the shutter portion st1 of the optical modulation element portion may be kept in an open state during a period of 0.75×T1, and the shutter portion st1 of the optical modulation element portion may be kept in a closed state during a period of 0.75×T1. In other words, in the display device 3000, the shutter open/close time at each pixel can be set to 1.5 times as that of the shutter open/close time at each pixel in the case of the display device 1000.

In this way, in the display device 3000, the shutter open/close time at each pixel can be set longer, whereby the light emission intensity of the light source of the backlight unit 1 can be reduced, as compared with the display device 1000 of Embodiment 1 (in order to express a certain gray level value, the amount of projected light during a constant period may be set to a predetermined amount, and hence, the light emission intensity of the light source of the backlight unit 1 can be reduced, for the increase in the period of time while the shutter at each pixel is opened during a constant period). As a result, the electric power consumption of the backlight unit 1 can be reduced. Further, as is clear from FIG. 9, the frequency of the source driving signal can be lowered, whereby the electric power consumption during the source driving can be reduced.

As described above, in the display device 3000, regions segmented in the horizontal direction are set, and the gate driving is performed with respect to the regions segmented in the horizontal direction simultaneously, whereby the electric power consumption of the backlight unit 1 can be reduced, and further, the frequency of the source driving signal can be lowered. With this configuration, in the display device 3000, the electric power consumption can be further reduced.

The method for setting the regions segmented in the horizontal direction is not limited to the above-described method, but the regions segmented in the horizontal direction may be set by another method, with another number of segmented regions.

Further, in a case where the regions segmented in the horizontal direction are segmented equally into k (k: natural number) and are driven in parallel, the extension rate of the light emission time of the backlight unit 1 is $(2-1/k)$ times. Here, it is assumed that the period of time for setting the optical modulation element portions of all of the pixels in the display panel unit 2 to the initial state line-sequentially without parallel driving is 50% of one subframe time. Then, in the display device 3000, the shutter open/close time at each pixel also can be set longer in proportion to this extension rate of the light emission time of the backlight unit 1. In other words, as the number of the segmented regions driven in parallel is increased, the extension rate of light emission time of the backlight unit 1 also increases, whereby the shutter open/close time at each pixel can be set longer.

Other Embodiments

Part of or all of the above-described embodiments may be used in combination so that a display device is realized.

Further, the configuration of the MEMS shutter of the optical modulation, element portion in the embodiments described above is one example, and the optical modulation element portion may be formed by using a MEMS shutter of another configuration.

Further, a part of an entirety of the touch-panel-equipped display device of the above-described embodiments may be realized as an integrated circuit (for example, an LSI, a system LSI, or the like).

A part or an entirety of a processing operation of each function block of the above-described embodiments may be realized with programs. A part or an entirety of a processing operation of each function block of the above-described embodiments may be executed by a central processing unit (CPU) in a computer. Further, the programs for executing the respective processing operations may be stored in a storage device such as a hard disk or a ROM, and the central processing unit (CPU) may read the programs from a ROM or a RAM and execute the same.

Further, each processing operation in the above-described embodiments may be realized with hardware, or may be realized with software (including a case of being realized together with an operating system (OS)), middleware, or a predetermined library). Further alternatively, each processing operation may be realized with software and hardware in combination.

Still further, the order of execution of operations in the processing method in the above-described embodiments is not limited to that in the above-described embodiments. The order can be changed without deviating from the scope of the invention.

A computer program that causes a computer to execute the above-described method, and a computer-readable recording medium in which the program is recorded, are encompassed in the scope of the present invention. Here, examples of the computer-readable recording medium include a flexible disk, a hard disk, a CD-ROM, an MO, a DVD, a large-capacity DVD, a next-generation DVD, and a semiconductor memory.

The above-described computer program is not limited to a program recorded in, the above-described recording medium, but may be a program that is transmitted through a network or the like that is typically, for example, an electric communication channel, a wireless or wired communication channel, or the Internet.

Still further, in part of the descriptions of the above-described embodiments, only principal members essential for the above-described embodiments, among the constituent members, are, described in a simplified manner. The configurations of the above-described embodiments can include arbitrary constituent members that are not clearly mentioned in the descriptions of the embodiments. Further, in the descriptions and the drawings of the above-described embodiments, some of the respective sizes of the members do not faithfully represent the real sizes, the real dimension ratios, and the like.

The specific configuration of the present invention is not limited to the configurations of the above-described embodiments, but can be variously changed and modified without deviating from the scope of the invention.

[Supplementary Note]

The present invention can be also described as follows.

The first invention is a display device that includes a backlight unit, a display panel unit, a source driver, and a controller.

The backlight unit includes a light source.

The display panel unit includes a plurality of first segmented regions, each of the first segmented regions including: a plurality of pixels each of which includes an optical modulation element that performs modulation control with respect to light emitted from the backlight unit; and a segmented gate driver for controlling the optical modulation elements of the pixels.

The source driver is a driver for controlling the optical modulation elements of the pixels.

The controller controls the light source, the segmented gate drivers, and the source driver.

This display device has such a configuration that the segmented gate drivers thus segmented are arranged in the display panel unit. In this display device, therefore, the lengths of the gate lines connected to the respective segmented gate drivers can be significantly decreased, as compared with the lengths of the gate lines connected to the conventional gate driver (the length equivalent to pixels of about one line of the display panel unit).

In other words, in the case of this display device, the lengths of the gate lines connected to the respective segmented gate drivers can be significantly decreased as compared with the conventional cases, which allows a gate pulse signal (gate driving signal) having reduced signal delay or reduced waveform distortion (waveform roundness) to be output from the respective segmented gate drivers with a low voltage. As a result, in the display device, the electric power consumption in the gate driving control can be reduced, which allows the electric power consumption in the display device to be reduced as well.

Further, in the display device, since the gate driver is arranged as the segmented gate drivers within the display panel unit, it is not necessary to provide a space for providing a gate driver outside the display panel unit, which is different from the conventional display device. In the display device, therefore, by providing the segmented gate drivers within the display panel unit, the peripheral region (frame region) of the display panel unit can be reduced in size.

The second invention is the first invention in which the controller generates a second segmented region setting signal for setting second segmented regions by segmenting the pixels of the display panel unit according to the number of gray levels to be displayed, and outputs the generated second segmented region setting signal to the source driver.

The source driver sets a highest frequency of the source driving signal for driving the pixels included in the second segmented regions based on the second segmented region setting signal, and drives the pixels included in the second segmented regions with the source driving signal having the highest frequency thus set.

With this configuration, in this display device, the number of gray levels to be expressed in each pixel region (each second segmented region) can be figured out, and the highest frequency of the source driving signal can be set according to the number of gray levels to be expressed. In other words, in this display device, a pixel region (a second segmented region) in which the number of gray levels to be expressed is small can be driven with a source driving signal having a lower highest frequency, and therefore, the electric power consumption in this display device can be reduced.

The third invention is the first or second invention in which the controller sets k third segmented regions AR(1) to AR(k) in which the pixels of the display panel unit are segmented per one or a plurality of scanning lines, generates gate control signals SG(1) to SG(k) for controlling gate driving with respect to the pixels included in the third segmented regions AR(1) to AR(k) so that the gate control signals SG(1) to SG(k) correspond to the third segmented regions AR(1) to AR(k), respectively, and outputs the generated gate control signals SG(1) to SG(k) to the segmented gate drivers corresponding thereto, respectively.

Then, the controller respectively drives the segmented gate drivers corresponding to the gate control signals SG(1) to SG(k) in parallel.

In this display device, since the gate driving can be performed simultaneously with respect to the regions (third segmented regions) thus segmented into k, the period of time required for setting the optical modulation element portions of all of the pixels of the display panel unit to the initial state can be decreased (can be decreased to about 1/k). In this display device, the light emission time of the light source of the backlight unit can be set longer, for the decrease in the period of time required for setting the optical modulation element portions of all of the pixels in the display panel unit to the initial state, and in proportion to this, the open/close time of the shutter of the optical modulation element portion of each pixel can be set longer.

Since the shutter open/close time at each pixel can be set longer in this display device in this way, it is possible to reduce the light emission intensity of the light source of the backlight unit, as compared with conventional cases. As a result, in this display device, the electric power consumption of the backlight unit can be reduced. Further, since the shutter open/close time at each pixel can be set longer in this display device, the frequency of the source driving signal can be lowered. As a result, in this display device, the electric power consumption during the source driving can be reduced.

The fourth invention is any one of the first to third inventions in which the optical modulation element is a microelectromechanical system (MEMS) device.

With this configuration, a display device can be realized with use of MEMS devices as optical modulation elements.

INDUSTRIAL APPLICABILITY

With the present invention, a display device can be realized in which the electric power consumption when optical modulation elements (for example, MEMS shutters) are driven can be reduced. The present invention is therefore useful in the field of the display-device-related industry, and can be implemented in this field.

DESCRIPTION OF REFERENCE NUMERALS

1000, 2000, 3000 display device
1 backlight unit
2 display panel unit
3, 3A, 3B source driver
4, 4A, 4B controller
GD11 to GDnm segmented gate driver

The invention claimed is:

1. A display device comprising:
a backlight unit that includes a light source;
a display panel unit that includes a plurality of first segmented regions, each of the first segmented regions including:
 a plurality of pixels each of which includes an optical modulation element that performs modulation control with respect to light emitted from the backlight unit; and
 a segmented gate driver that controls the optical modulation elements of the pixels;
a source driver that controls the optical modulation elements of the pixels; and
a controller that controls the light source, the segmented gate drivers, and the source driver,
wherein the controller generates a second segmented region setting signal for setting second segmented regions by segmenting the pixels of the display panel unit according to the number of gray levels to be displayed, and outputs the generated second segmented region setting signal to the source driver, and
the source driver sets a highest frequency of the source driving signal for driving the pixels included in the second segmented regions based on the second segmented region setting signal, and drives the pixels included in the second segmented regions with the source driving signal having the highest frequency thus set.

2. The display device according to claim 1,
wherein the controller
sets k third segmented regions AR(1) to AR(k) in which the pixels of the display panel unit are segmented per one or a plurality of scanning lines, generates gate control signals SG(1) to SG(k) for controlling gate driving with respect to the pixels included in the third segmented regions AR(1) to AR(k) so that the gate control signals SG(1) to SG(k) correspond to the third segmented regions AR(1) to AR(k), respectively, and outputs the generated gate control signals SG(1) to SG(k) to the segmented gate drivers corresponding thereto, respectively, and respectively controls the segmented gate drivers corresponding to the gate control signals SG(1) to SG(k) in parallel.

3. The display device according to claim 1,
wherein the optical modulation element is a microelectromechanical system (MEMS) device.

* * * * *